(12) United States Patent
Milne

(10) Patent No.: US 8,615,416 B2
(45) Date of Patent: Dec. 24, 2013

(54) METHOD FOR AVOIDING OR LIMITING EARLY BUILD DUE TO YIELD DECREASES

(75) Inventor: Robert J. Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 2238 days.

(21) Appl. No.: 11/276,376

(22) Filed: Feb. 27, 2006

(65) Prior Publication Data

US 2006/0111954 A1  May 25, 2006
US 2007/0203773 A1  Aug. 30, 2007

(51) Int. Cl.
 *G06Q 10/00* (2012.01)

(52) U.S. Cl.
 USPC ....... 705/7.12; 705/7.13; 705/7.25; 705/7.29; 717/101; 700/100

(58) Field of Classification Search
 USPC .................. 705/1–11, 7.13, 7.25, 7.29, 7.12; 717/101; 700/100
 See application file for complete search history.

(56) References Cited

U.S. PATENT DOCUMENTS

| | | | | |
|---|---|---|---|---|
| 5,040,123 A | * | 8/1991 | Barber et al. ................. | 700/100 |
| 5,195,041 A | * | 3/1993 | George et al. ................. | 700/100 |
| 5,369,570 A | * | 11/1994 | Parad ................. | 705/8 |
| 5,440,480 A | * | 8/1995 | Costanza ................. | 705/8 |
| 5,467,285 A | * | 11/1995 | Flinn et al. ................. | 700/95 |
| 5,559,710 A | * | 9/1996 | Shahraray et al. ............. | 700/100 |
| 5,943,484 A | * | 8/1999 | Milne et al. ................. | 700/100 |
| 5,971,585 A | * | 10/1999 | Dangat et al. ................. | 700/102 |
| 6,041,267 A | * | 3/2000 | Dangat et al. ................. | 700/107 |
| 6,049,742 A | * | 4/2000 | Milne et al. ................. | 700/99 |
| 6,086,619 A | * | 7/2000 | Hausman et al. ................. | 703/6 |
| 6,115,642 A | * | 9/2000 | Brown et al. ................. | 700/104 |
| 6,243,613 B1 | * | 6/2001 | Desiraju et al. ............... | 700/104 |
| 6,272,389 B1 | * | 8/2001 | Dietrich ................. | 700/101 |
| 6,983,190 B2 | * | 1/2006 | Denton et al. ................. | 700/103 |
| 7,369,910 B2 | * | 5/2008 | Surholt et al. ................. | 700/99 |
| 2001/0004520 A1 | * | 6/2001 | Nomoto et al. ............... | 434/109 |
| 2005/0096771 A1 | * | 5/2005 | Denton et al. ................. | 700/103 |
| 2005/0222888 A1 | * | 10/2005 | Hosoda et al. ................. | 705/8 |
| 2006/0190113 A1 | * | 8/2006 | Boutemy et al. ................ | 700/97 |

\* cited by examiner

*Primary Examiner* — Jonathan G Sterrett
*Assistant Examiner* — Stephen S Swartz
(74) *Attorney, Agent, or Firm* — Gibb & Riley, LLC; Richard M. Kotulak, Esq.

(57) ABSTRACT

Disclosed are embodiments of an improved production planning method that avoids or limits early builds. The method comprises running a conventional production planning program using standard inputs (e.g., date effective yields). The outputs of the program (e.g., a plan including planned inventory overstocks at given times) are evaluated to determine if the program plans an early build and if the planned early build may have been triggered by a predicted decrease in yield. If an early build is planned and if a correlation exists between the decrease in yield and the early build, then, optionally, new constraints are added into the program and the program is re-run so that the early build is either avoided or limited to that of the proper yield. Thus, the method can be used to reduce early builds due to an incorrect, nominally higher, yield without requiring the user to provide any special additional input data.

13 Claims, 3 Drawing Sheets

METHOD FOR AVOIDING OR LIMITING EARLY BUILD DUE TO YIELD DECREASES

BACKGROUND

1. Field of the Invention

The embodiments of the invention generally relate to computer-implemented decision support systems for determining production planning. General methodologies within this field of study include advanced planning systems, optimization and heuristic based algorithms, constraint based programming, and simulation. More particularly, the embodiments of the invention relate to a production planning method that avoids or limits early builds.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demands to satisfy and how to satisfy them. This resource allocation problem is often addressed through linear programming.

A linear program (LP) is composed of an objective function that defines a measure of the quality of a given solution, and a set of linear constraints. A production planning linear program (such as described in U.S. Pat. No. 5,971,585, Dangat, et al., "Best can do matching of assets with demand in microelectronics manufacturing," Oct. 16, 1999, and incorporated herein by reference) will determine production planning decisions including: manufacturing releases, material substitutions, and shipments planned to customers, between manufacturing and distribution locations, and from vendor suppliers. Similar production planning methods are also disclosed in the following reference (incorporated herein by reference): U.S. Pat. No. 5,943,484, Milne, et al., "Advanced material requirements planning in microelectronics manufacturing," Aug. 24, 1999. However, while these prior art references disclose planning methods that were satisfactory for the purposes for which they were intended, there is still a need in the art for computer-implemented production planning methods that provide improvements over the prior art.

SUMMARY

In view of the foregoing, embodiments of the invention provide a production planning method. Specifically, embodiments of the method of the invention comprise: (1) predicting product yields over time and inputting the predicted yields into a production planning program; (2) running the production planning program; (3) determining if the program plans an early build; (4) optionally, determining if a planned early build may have been triggered by a predicted decrease in yield; (5) if an early build is planned and, optionally, if it is correlated to a decrease in yields, adding constraint(s) into the program to avoid the early build; (6) optionally, adding additional decision variable(s) into the program to plan any early build with the later (lower) yield; (7) and re-running the program.

More particularly, the method can comprise predicting product yields over time (e.g., predicting a first yield for a product during a first time period and a second yield for that product during a second, later, time period). These predicted yields are input into a production planning program. For example, the production planning program can comprise a linear program (LP) or other suitable program that is designed to determine production planning decisions including: manufacturing releases, material substitutions, and shipments planned to customers, between manufacturing and distribution locations, and from vendor suppliers. The types of equations used in production planning LP can include: (1) Material Balance Constraints, which ensure conservation of material flow through the network of stocking points comprising the supply chain; (2) Capacity Constraints, which ensure that the capacity available for manufacturing activities is not exceeded; (3) Backorder Conservation Constraints, which balance the quantity of a given part backordered in a given planning period with the quantity backordered in the previous planning period and the net of new demand and new shipments; and (4) Sourcing Constraints, which define target ranges (minimum and maximum) of shipments that should be made from a particular manufacturing or vendor location in the supply chain. Thus, a plan output from running the program can include planned excess inventory costs resulting from planned overstocks during given time periods.

After the program is run, the plan can be evaluated to determine if the program has planned an early build. That is, a determination can be made as to whether the plan comprises producing a predetermined quantity of the product in the first time period, when that predetermined quantity is to be consumed during the second, later, time period.

Once a determination is made that an early build is planned, then one or more constraints can be programmed into the production planning program so that the early build is avoided. Optionally, additional decision variable(s), as well as the constraint(s), can be added into the program so that the early build of that predetermined quantity of the product is is limited, as opposed to avoided. For example, a maximum production level permissible to avoid an early build can be calculated. This maximum production level can then be used to develop a constraint which is added into the program to avoid the early build. Then, optionally, additional decision variables can further be added into the program to allow the early production of that predetermined quantity of the product subject to limitations, for example, only with the decreased yield (i.e., the second yield). This embodiment would, therefore, allow the early build, if warranted for some other reason such as limited capacity.

Once the constraint(s) and, if applicable, the additional decision variable(s) are programmed-in, then the production planning program is again run. This time it is run with the added constraint(s) and, if applicable, the additional decision variable(s), thereby, either limiting the early build of the predetermined quantity of product or avoiding it all together.

Those skilled in the art will recognize that the features of the present invention may be automatically initiated, whenever an early build is planned, as well as subject to being manually turned on or off by the user if the situation warrants and/or subject to user established rules.

Specifically, such user established rules can set out when this logic should be applied. That is, rules can indicate that the production planning program should be run with the constraints only if certain conditions are established, such as, running the program with the constraints only if a determination is made that the planned early build may have been triggered by a predicted decrease in yield between the first and second time periods. This determination can be made upon a detailed analysis of the outputs of the production planning program and can be dependent upon whether or not the inventory costs for the product at subsequent stocking points in the production process are non-decreasing or decreasing.

For example, if the inventory costs are non-decreasing (i.e., if at each stage in production the inventory costs remain the same or increase), then a determination can be made as to whether or not an early build was most likely planned because of yield decreases by looking at a single stocking point. Specifically, if inventory costs increase through the various stages of production, then production planning programs will typically not initiate an early build and forward a product down the line to be stored as excess inventory later in the production process because of the increase in inventory costs. Thus, a direct correlation can be made between a planned excess of inventory (i.e., an overstock of inventory) at a single stocking point followed immediately by a planned decrease in yield. Consequently, the determination of whether the decease in planned yield may have triggered the planned early build can be made by identifying when a planned overstock of inventory at a single stocking point immediately precedes the planned decrease in yield (i.e., immediately proceeds the second time period).

However, if inventory costs for the product decrease (i.e., if at subsequent stages in production the inventory costs decrease), then a direct correlation can not be made between the excess inventory at a single stocking point and a subsequent planned decrease yield. Specifically, if a decrease in planned yield is found in a production line that has decreasing inventory costs, then the production planning program may not plan to immediately stock the excess inventory but rather may plan to continue production and stock the excess inventory further down the line at a point where the inventory costs are cheaper. Thus, to determine if a decrease in yield may have triggered an early build, a planned overstock of inventory at a single stocking point must first be identified. Then, a search must be performed backwards through the bills of material supply chain, recursively if necessary, to identify the decrease between the first yield and the second yield that triggered the production planning program to plan to produce the product prior to the second time period.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
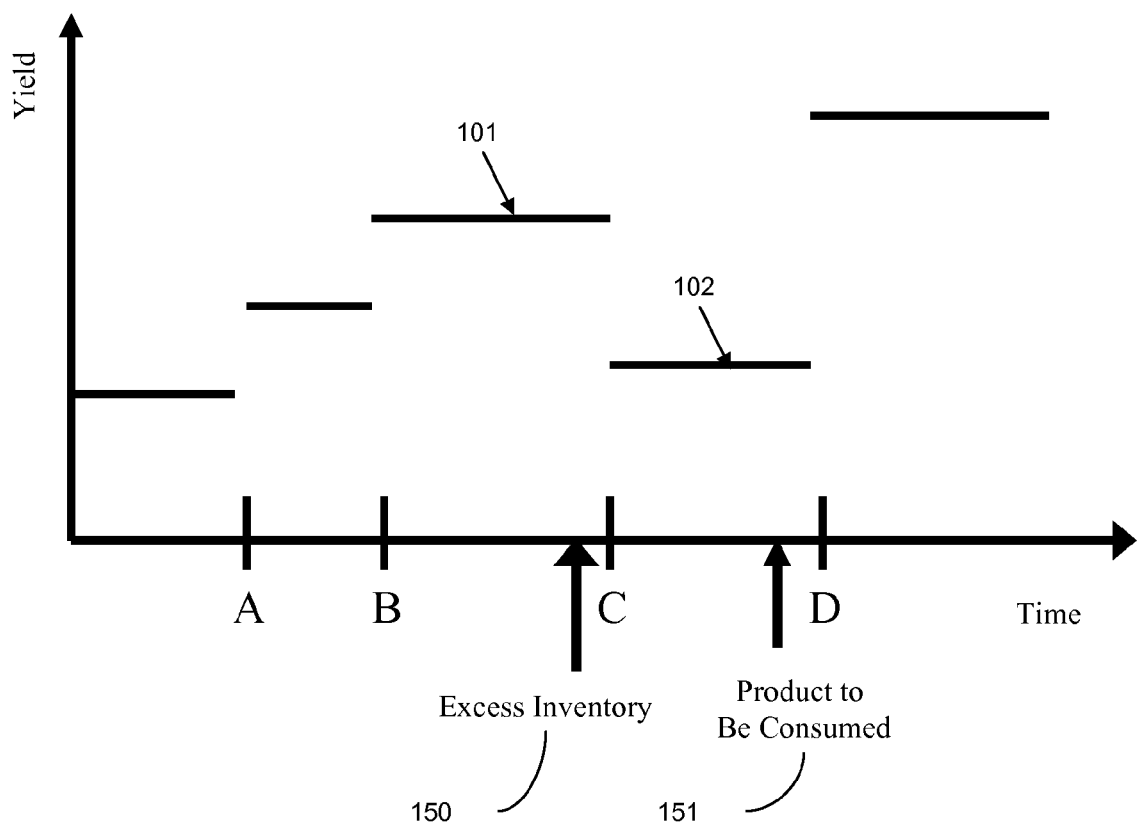
FIG. 1 is a graph illustrating predicted yield over time and initiation of an early build.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, a linear program (LP) is composed of an objective function that defines a measure of the quality of a given solution, and a set of linear constraints. A production planning linear program, such as that described in U.S. Pat. No. 5,971,585, will determine production planning decisions including: manufacturing releases, material substitutions, and shipments planned to customers, between manufacturing and distribution locations, and from vendor suppliers. The types of equations used in production planning models are well know to those practiced in the art and include: (1) Material Balance Constraints, which ensure conservation of material flow through the network of stocking points comprising the supply chain; (2) Capacity Constraints, which ensure that the capacity available for manufacturing activities is not exceeded; (3) Backorder Conservation Constraints, which balance the quantity of a given part backordered in a given planning period with the quantity backordered in the previous planning period and the net of new demand and new shipments; and (4) Sourcing Constraints, which define target ranges (minimum and maximum) of shipments that should be made from a particular manufacturing or vendor location in the supply chain.

A conventional LP formulation is provided below in the form familiar to those practiced in the art; i.e., definition of subscripts, definition of objective function coefficients, definition of constants, definition of decision variables, LP formulation or equations.

Definition of Subscripts j—time period m—material (part number)

a—plant location within the enterprise n—material being substituted z—group (which represents a family or collection of part numbers)

e—process (a method of purchasing or manufacturing a material at a plant)

v—receiving plant location k—demand center (i.e., customer location) (Note: the set of customer locations is mutually exclusive from the set of plant locations)

q—demand class which indicates relative priority w—resource capacity which could be a machine, labor hour, or other constraint u—represents a consumer location which refers to an internal plant, external demand center, or to
a generic indicator meaning any plant/or demand center Definition of Objective Function Coefficients $PRC_{jmae}$—cost of releasing one piece of part m during period j at plant a using process e $SUBC_{jmna}$—substitution cost per piece of part number n which is being substituted by part number m during period j at plant a $TC_{jmav}$—transportation cost per piece of part number m leaving plant a during period j which are destined for plant v $INVC_{jma}$—inventory cost of holding one piece of part number m at the end of period j at a particular plant a $DMAXC_{jza}$—cost per piece of exceeding the maximum amount of shipments of group z parts from plant a to consuming location(s) u during period j $DMINC_{jzau}$—cost per piece of falling short of the minimum amount of shipments specified for group z parts from plant a to consuming location(s) u during period j $BOC_{jmkq}$—backorder cost of one piece of part m at the end of period j for class q demand at customer location k Definition of Constants $DEMAND_{jmkq}$—demand requested during time period j for part number m at customer location k for demand class q $RECEIPT_{jma}$—quantity of projected WIP and purchase order receipts for part number m expected to be received at plant a during time period j $CAPACITY_{jaw}$—Capacity of resource w available at plant a during period j to support production starts $CAPREQ_{jmaew}$—Capacity of resource w required for part number m at plant a for process e during period j $QTYPER_{jmaen}$—quantity of component m needed per part number n during period j at plant a using process e $YIELD_{jmae}$—output of part number m per piece released or started at plant a during time period j using process e $SUBQTY_{jmna}$—quantity of part number m required to substitute for one piece of part number n at plant a during time period j $MAXPCT_{jcza}$—maximum percentage of total shipments of group z (collection of parts) leaving supplier a during period j to support consumption at consuming location(s) u $MINPCT_{jzau}$—minimum percentage of total shipments of group z (collection of parts) leaving supplier a during period j to support consumption at consuming location(s) u $CT_{jmae}$—Cycle time. The number of periods between the release and completion of part m jobs for releases made using process e at plant a during time period j $TT_{mav}$—transport time for part number m from plant a to plant v Definition of LP Decision Variables $I_{jma}$—Inventory at the end of period j for part number m at a particular plant a $P_{jmae}$—Production starts of part m during period j at plant a using process e $L_{jmna}$—Quantity of part number n which is being substituted by part number m during period j at plant a $T_{jmav}$—Internal shipments of part number m leaving plant a during period j which are destined for plant v $F_{jmakq}$—Shipments of part number m leaving plant a during period j and satisfying class q demand at external customer k $B_{jmkq}$—Back orders of part m at the end of period j for class q demand at customer location k $H_{jzu}$—Total shipments of group z (z is a "collection" of parts) leaving suppliers during period j to support consumption at consuming location(s) u $S_{jzau}$—Amount by which total shipments of parts in z from plant a to consuming location(s) u during period j exceeds the maximum amount specified as desired in the sourcing rules $G_{jzau}$—Amount by which total shipments of group z parts from plant a to consuming location(s) u during period j falls short of the minimum amount specified as desired in the sourcing rules LP Equations or Formulation The following minimizes the objective function subject to the constraints shown below.

Objective Function:
  Minimize:

$$\sum_j \sum_m \sum_a \sum_e PRC_{jmae} P_{jmae} +$$
$$\sum_j \sum_m \sum_n \sum_a SUBC_{jmna} L_{jmna} + \sum_j \sum_m \sum_a \sum_v TC_{jmav} T_{jmav} +$$
$$\sum_j \sum_m \sum_a INVC_{jma} I_{jma} + \sum_j \sum_z \sum_a \sum_u DMAXC_{jzau} S_{jzau} +$$
$$\sum_j \sum_z \sum_a \sum_u DMINC_{jzau} G_{jzau} + \sum_j \sum_m \sum_k \sum_q BOC_{jmkq} B_{jmkq}$$

Subject to:
Sourcing Constraints:

$$H_{jzu} = \sum_{\substack{m \\ \varepsilon z}} \sum_a \left( T_{jmau} + \sum_q F_{jmauq} \right)$$

$$\sum_{\substack{m \\ \varepsilon z}} \left( T_{jmau} + \sum_q F_{jmauq} \right) - S_{jzau} \leq MAXPCT_{jzau} H_{jzu}$$

$$\sum_{\substack{m \\ \varepsilon z}} \left( T_{jmau} + \sum_q F_{jmauq} \right) - G_{jzau} \leq MINPCT_{jzau} H_{jzu}$$

Capacity Constraints:

$$\sum_m \sum_e CAPREQ_{jmaew} P_{jmae} \leq CAPACITY_{jaw}$$

Backorder Constraints:

$$B_{jmkq} = B_{(j-1)mkq} + DEMAND_{jmkq} - \sum_a F_{jmakq}$$

Material Balance Constraints:

$$I_{jma} = I_{(j-1)ma} + RECEIPT_{jma} + \sum_{\substack{xs.t \\ x+CTxmae=j}} \sum_e YIELD_{xmae} * P_{xmae} +$$
$$\sum_n L_{jmna} + \sum_{\substack{xs.t \\ x+TT_{mav}=j}} \sum_v T_{xmva} - \sum_n SUBQTY_{jmna} * L_{jmna} -$$

-continued $$\sum_v T_{jmav} - \sum_k \sum_q F_{jmakq} - \sum_{\substack{nst.in \\ is\ a\ component \\ of\ n}} \sum_e QTYPER_{jmaen}$$

Non-Negativity Constraints:
all $X_{i,j...} \geq 0$, where X is a generic decision variable and i, j etc. represent generic subscripts.

In high tech industries (e.g., semiconductor manufacturing) production planning programs, for example linear programs (LPs), such as the supply chain linear programming model shown above, or other suitable production planning programs, are often fed with date-effective predicted yields (i.e., the predicted number of products that will meet defined standards divided by the total number of products produced during a defined time period). Referring to FIG. 1, typically, yields increase over time due to knowledge gained throughout the production process (i.e., due to a learning curve). For example, see predicted yield increase in time period B-C over time period A-B. However, on occasion, a systematic defect in the production process or in the material used in production is accidentally or unavoidably introduced into the production process and rectified some period of time later (e.g., when it's identified). Such defects may result in a planned decrease in yield for a period of time (i.e., a decrease from a first yield that is predicted for a first time period and a second, lower, yield that is predicted for a later second time period). For example, see the decrease in the yield 102 that is predicted for time period C-D compared to the yield 101 that is predicted for time period B-C. Specifically, the interval between points C and D refers to that period of time when jobs exposed to the inadvertent (and temporary) defect will be completed through a test stage of manufacturing (e.g., final test).

The problem, which is addressed by the present invention, is that for the most part production planning linear programs will tend to exploit what is perceived as a higher yield opportunity resulting from production immediately prior to time C (i.e., what is perceived as a higher yield opportunity during time period B-C compared to time period C-D). That is, the LP will tend to plan the build of a product early and plan to hold the product in excess inventory 150 before time C for later consumption between times C and D (i.e., based on a decrease from a first yield 101 planned during a first time period B-C and a second yield 102 planned during a second later time period C-D, the LP will plan to produce the product prior to the second time period C-D even though the product is to be consumed during that second time period C-D). However, the nominally higher yield resulting from early production just prior to time C is a mirage. Jobs that are exposed to the inadvertent defect will not have higher yields just because they are built earlier than they need to be. The defect is already in the line so building the product earlier may only cause the lower yield to materialize earlier and create higher inventory costs due to the need to store excess product (i.e. overstock) until it is consumed. Due to the increase in inventory costs, it would be preferable if the LP did not exploit that apparently higher yield; instead it would be advantageous if the LP satisfied consumption requirements between C and D by producing the required product between C and D.

One way to solve this problem would be to have large inventory holding cost penalties immediately prior to the yield decrease. The idea behind this approach would be to penalize the early build severely and thereby discourage it. However, such penalties can result in the inventory being consumed needlessly early further down the supply chain. Careful setting of inventory holding costs across the supply chain can mitigate this drawback but so doing would require significant analysis for the user, may introduce unwanted side effects, and does not necessarily resolve the original problem depending upon the particulars. An even less effective approach would be to feed the LP with yields which do not represent the decrease even though such yields are not accurate.

Figure 2:
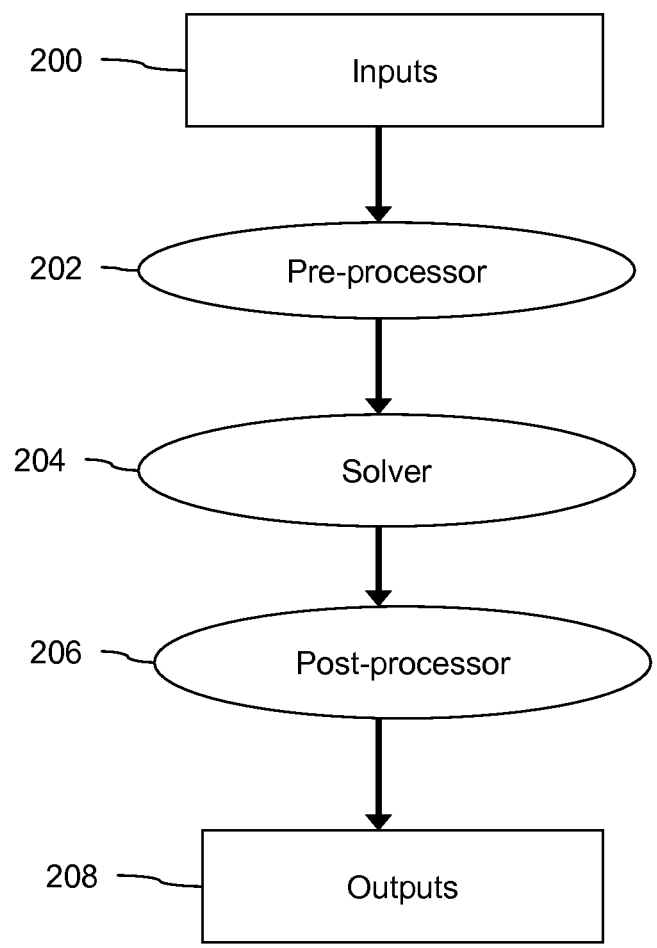
FIG. 2 is diagram illustrating an overview of the structure of a typical linear programming application.

In view of the foregoing, disclosed is a production planning method (e.g., a computer-implemented production planning method) that avoids or limits early builds, for example, early builds that may be due to planned yield decreases. Referring to FIG. 2, production planning programs typically include the transformation of input files 200 into output files 208 through a pre-processor 202, solver 204, and post-processor 206. The pre-processor 202 transforms the raw input files into a form useable by a linear programming (or similar) solver. The solver 204 determines an optimal raw output solution which is transformed by the post-processor 206 into a format acceptable for usage. The embodiments of the present invention are embedded into such applications. Specifically, embodiments of the present invention evaluate the outputs 208 and determine if the solver 204 has planned an early build (i.e., planned to build a product in a first time period, when the product is to be consumed in a second later time period). If such an early build is planned, the invention programs one or more constraints and, optionally, one or more additional decision variables, back into the solver 204 and would then rerun the solver 204 and the post-processor 206 with the constraint and, if applicable, the additional decision variable in order to avoid or limit an output 208 that would call for an early build. Limitations may be placed on the programming of the constraint (and the additional decision variable, if applicable) or the re-running of the program with the constraint (and the additional decision variable, if applicable). For example, constraint use may be limited to situations in which it has been determined that an early build may have been triggered by a predicted decrease in product yield. Although the embodiments of the invention are described herein in the context of using a linear program as the solver 204 (i.e., as the production planning program), those skilled in the art will recognize that any production planning program, such as an Advanced Planning System (APS), could be used as the solver including a heuristic based APS.

Figure 3:
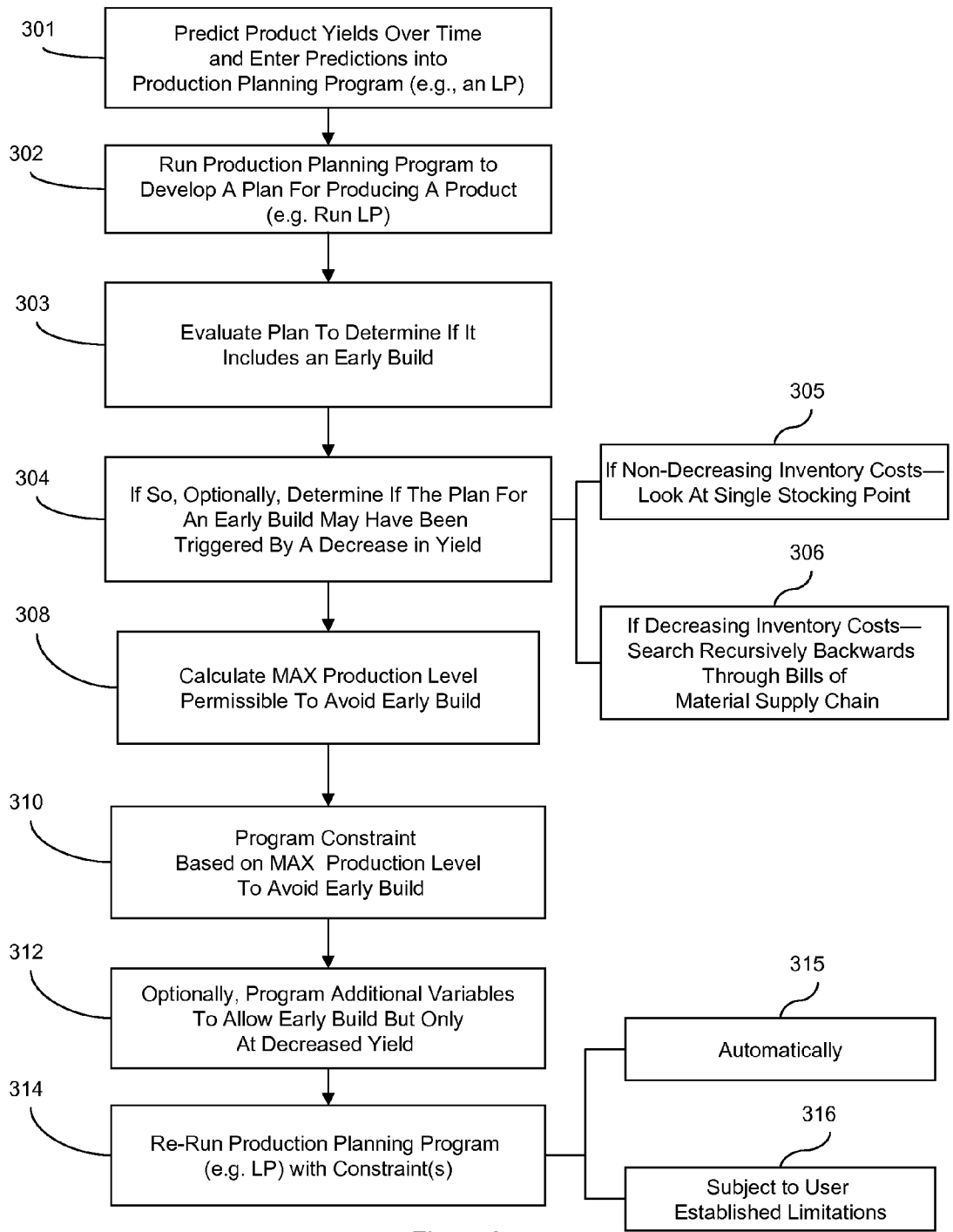
FIG. 3 is a schematic flow diagram illustrating an embodiment of the method the invention.

Specifically, referring to FIG. 3, embodiments of the method of the invention comprise: (1) predicting product yields over time and inputting those predicted yields into a production planning program (301); (2) running the production planning program (302); (3) determining if the program plans an early build (303); (4) determining if the planned early build may have been triggered by a predicted decrease in product yield over time (304); (5) calculating maximum production permitted to avoid the early build (308); (6) if an early build is planned and, optionally, if it is correlated with a decrease in product yield over time, then adding one or more constraints into the program to avoid the early build based on this maximum production level (310); (7) optionally, also adding one or more additional decision variables into the program to allow an early build subject to limitations (e.g., only at decreased yield) (312); and (8) re-running the program, either automatically (315) or subject to user established limitations (316) so that the early build is either avoided or limited (314).

The feature of running a production planning program (e.g., a linear program (LP)) (302) is accomplished using all the typical input data for such programs (e.g., time effective yields (301)). Step 302 is the same as steps 202-206 of FIG. 2, as described above. As mentioned above, although the embodiments of the invention are described herein in the context of using a linear program, those skilled in the art will recognize that any Advanced Planning System (APS) could be used as the solver including a heuristic based APS. The production planning program can be run, using prior art LP methodology, as illustrated in FIG. 2 (e.g., using methodology similar to that described in U.S. Pat. No. 5,971,585 cited above and incorporated by reference). This production planning program will determine production planning decisions including: manufacturing releases, material substitutions, and shipments planned to customers, between manufacturing and distribution locations, and from vendor suppliers. The types of equations used in production planning program can include: (1) Material Balance Constraints, which ensure conservation of material flow through the network of stocking points comprising the supply chain; (2) Capacity Constraints, which ensure that the capacity available for manufacturing activities is not exceeded; (3) Backorder Conservation Constraints, which balance the quantity of a given part backordered in a given planning period with the quantity backordered in the previous planning period and the net of new demand and new shipments; and (4) Sourcing Constraints, which define target ranges (minimum and maximum) of shipments that should be made from a particular manufacturing or vendor location in the supply chain. Thus, a plan that is output as a result of running the program will, for example, include planned excess inventory (i.e., overstocks) and/or excess inventory costs at given time periods (e.g., as illustrated in FIG. 1).

After the program is run (at process 302), the plan can be evaluated to determine if an early build is planned (303). That is, the plan is evaluated to determine if a predetermined quantity of the product is to be consumed during a given time period (i.e., the second time period), but that predetermined quantity is scheduled to be built in an earlier time period (i.e., the first time period). For example, a determination is made that an early build of 100 widgets is planned if those 100 widgets are to be used during the second time period, but are to be built during an earlier first time period. This determination can be based on a planned excess inventory 150 for the product in the first time period. Specifically, building a predetermined quantity of a product in the first period, when that predetermined quantity is to be used at a given time 151 in the second time period will result in excess inventory 150 for the product during the first time period.

Once a determination has been made that an early build of a predetermined quantity of a product is planned (at process 303), then one or more constraints can be programmed into the production planning program to avoid (i.e., prevent) the early build completely (310). Optionally, the method can also comprise adding one or more additional decision variables into the program in addition to the constraint added in at process 310 so that the early build of the predetermined quantity of the product is allowed but only with limitations (e.g., limitations that ensure that any early build is accounted for using the decreased yield) (312). Specifically, a maximum production level permissible to avoid an early build can be calculated (308). (An algorithm for executing steps 303-308 is described further below.) This maximum new production level can then be used to develop a constraint which is added into the program to avoid the early build (310).

For example, the following new constraint can be added into the LP so that early build due to yield decreasing will be avoided (310):

$$\Sigma_e \Sigma_{s \, s.t. \, s+CT \, smae<=t} YIELD_{s,m,a,e} * P_{smae} <= \text{max\_new\_prod}_{t,m,a}$$

An optional step (at process 312) of adding additional decision variables to the program so that the early build may be allowed subject to restrictions (e.g., allowing the early build only at the decreased yield amount) may or may not be desired depending upon the nature of the problem environment. Limiting the early build at process 312 provides the capability to build early for reasons other than exploiting the (deceptively) higher yield, but with a negative impact of increased run time. Invoking this function may be considered optional and, if invoked, can, for example, be accomplished, as described below.

To limit the early build at process 312, add a new decision variable (EP for "Early Production") into the program which will keep track of the production being built early which is not being supported by the higher yield. This decision variable will be instantiated only for those situations where the yield drops. The production resulting from such starts will be determined using the later (lower) yield of the subsequent time period. This early production should have a higher cost per piece than the usual production so as to discourage its use. (Having a lower yield would already tend to discourage such usage). Aside from the higher objective function cost coefficient and lower yield, this early production variable should be treated the same as the normal production variables in the equations. An exemplary formulation for implementing process 312 is provided below in a form familiar to those skilled in the art.

$EP_{jmae}$—Production starts of part m during period j at plant a using process e which is being built early for purposes other than exploiting a higher yield ("EP" for "Early Production")

And give that variable an objective cost coefficient . . .

$EPRC_{jmae}$—cost of releasing one piece of "early production" of part m during period j at plant a using process e Note: set $EPRC_{jmae} > EPRC_{jmae}$ so that it will be less preferred Add the Early Production (EP) variable to both the capacity constraint and the material balance constraint so that they look as follows.

Capacity Constraints:

$$\Sigma_m \Sigma_e CAPREQ_{jmaew} * (P_{jmae} + EP_{jmae}) <= CAPACITY_{jaw}$$

Material Balance Constraints:

$$I_{jma} = I_{(j-1)ma} + RECEIPT_{jma} +$$
$$\sum_{\substack{xs.t \\ x+CTxmae=j}} \sum_e (YIELD_{xmae} * P_{xmae} + YIELD_{(x+1)mae} * EP_{xmae}) +$$
$$\sum_n L_{jmna} + \sum_{\substack{xs.t \\ x+TT_{mav}=j}} \sum_v T_{xmva} - \sum_v SUBQTY_{jmna} * L_{jmna} - \sum_v T_{jmav} -$$
$$\sum_k \sum_q F_{jmakq} - \sum_{\substack{nst.m \\ \text{is a component} \\ \text{of } n}} \sum_e QTYPER_{jmaen}(P_{jnae} + EP_{jnae})$$

Once the added constraint(s) and, if applicable, variable(s) have been programmed-in (at process 310 and 312), then the production planning program is again run (314). This time the program is run with the added constraint(s) and, if applicable, variable(s), thereby, either avoiding the early build of the predetermined quantity of the product all together (i.e., resulting in an output solution from the production planning LP that is free of the needless early build) or limiting the early build.

Those skilled in the art will recognize that the features of the present invention may be automatically initiated, whenever an early build is planned, as well as subject to being manually turned on or off when warranted under certain circumstances (315) and/or subject to user established limitations (316).

Specifically, such user established rules or limitations can set out when this logic should be applied. These rules can indicate constraints and, if applicable, variables should be programmed in (at process 310 and at optional process 312) or that the production planning program should be re-run with the constraints and, if applicable, the variables (at process 314) only if certain conditions are established. For example, a rule can indicate that the constraints should be programmed in or the program should be re-rerun with the constraints only if a determination is made that the planned early build may have been triggered by a predicted decrease in yield between the first and second time periods (304). Thus, the method could be used to avoid exploitation by the program of a deceptively higher yield in the early time period. This determination can be made by evaluating the plan (i.e., the outputs of the production planning program) against the date-effective yields (e.g., see items 101 and 102 of FIG. 1). That is, a determination can be made as to whether the program, because of a decrease between a first yield 101 predicted for a first time period B-C and a second yield 102 predicted for a second time period C-D, has planned to produce a product prior to the second time period C-D even though the product is to be consumed during that second time period C-D (see FIG. 1). The evaluation of the outputs is dependent upon whether or not the inventory costs for the product at subsequent stocking points in the production process are non-decreasing or decreasing (i.e., at each stage in production the inventory costs remain the same or increase).

More particularly, inventory holding costs are typically non-decreasing as material flows down the supply chain. If inventory costs increase through the various stages of production, then the LP will generally not forward the product of an early build down the line so that it is stored as excess inventory later in the production. Rather, the LP will hold the excess inventory to avoid the even higher inventory costs later in the line. Because the product of the early build will not be forwarded down the line by the LP, a direct correlation can be made between a planned excess of inventory or excess of inventory costs 150 (i.e., an overstock of inventory) at a single stocking point (e.g., at a time just prior to time C) followed immediately by a planned decrease in yield (see yield 102). Consequently, a determination will be made as to whether the decrease in planned yield between two periods of time (e.g., the decrease between yields 101 and 102 at time periods B-C and C-D, respectively, of FIG. 1) may have been what caused a planned early build by identifying whether or not a planned overstock of inventory 150 at a single stocking point (e.g., just prior to point C) immediately precedes the planned decrease in yield (i.e., immediately precedes the second time period C-D) (305).

However, if inventory costs for the product decrease (i.e., if at subsequent stages in production the inventory costs decrease), then a direct correlation can not be made between the excess inventory at a single stocking point and a subsequent planned decrease yield. For example, in some production lines it is desirable to keep material flowing through the specified stages of manufacturing. To meet this desire and not clog an automated material handling system, as an example, inventory costs may be artificially high for some part numbers at various stages in production and then, decrease further downstream at the point where the material leaves the automated system. So, if a decrease in planned yield is found in a production line that has decreasing inventory costs, then the production planning program may not plan to immediately stock the excess inventory but rather may plan to continue production and stock the excess inventory further down the line at a point where the inventory costs are cheaper. As a result, when a needlessly early build occurs, the underlying yield decreasing cause may be further up the supply chain than where the inventory build up occurs. Consequently, to determine if a decrease in yield may have caused an early build, a planned overstock of inventory at a single stocking point must first be identified. Then, a search must be performed backwards through the bills of material supply chain, recursively if necessary, to identify the decrease between the first yield and the second yield that caused the production planning program to plan to produce the predetermined quantity of the product early (i.e., prior to the second time period) (306).

The following algorithm may be used to implement the features of steps 303-308, including the calculation of the maximum production permitted to avoid early build of a predetermined quantity of a product due to a yield decrease (308).

initalize max_new_prod to empty
For all material part numbers m, plants a, and time periods t . . .
If ($I_{t,m,a}$>0 and there exists $P_{s,m,a,e}$>0 such that t=s+$CT_{smae}$)
then

--- initialize max_new_prod to empty
For all material part numbers m, plants a, and time periods t ...
If ($I_{t,m,a}$ > 0 and there exists $P_{s,m,a,e}$ > 0 such that t = s + $CT_{smae}$ )
then
{
If $YIELD_{t,m,a,e}$ > $YIELD_{t+1,m,a,e}$ // If yield decreased...
then max_new_$prod_{t,m,a}$ = max(0,
    ($\Sigma_e \Sigma_{s\ s.t.\ s\ +\ CTsmae\ <=\ t}$ $YIELD_{smae}$ * $P_{smae}$ ) – $I_{tma}$ )
else // search for upstream components which may have the yield decrease
Find c and s s.t. $QTYPER_{smaec}$ > 0     // c = component of m
    and s + $CT_{smae}$ = t     // when released in s
If $I_{s,c,a}$ = 0 and $INVC_{s,c,a}$ > $INVC_{t,m,a}$
    then // perhaps component c was built early due to a yield decrease
        call the recursive check_component(c, s, a, ($I_{t,m,a}$ /
        $YIELD_{smae}$) * $QTYPER_{smaec}$)    // adjustments for Yield and
                                              Bills of Material Qty Per
}
check_component(m,t,a,qty) // check if material m is early building in time period t
{
If there exists $P_{smae}$ > 0 such that t = s + $CT_{smae}$ )
If $YIELD_{t,m,a,e}$ > $YIELD_{t+1,m,a,e}$ // If yield decreased...
then max_new_$prod_{t,m,a}$ = max(0,
    ($\Sigma_e \Sigma_{s\ s.t.\ s\ +\ CT\ smae\ <=\ t}$ $YIELD_{s,m,a,e}$ * $P_{smae}$ ) – qty )
else // look further back in the bills of material supply chain for a yield decrease
Find c and s s.t. $QTYPER_{smaec}$ > 0     // c = component of m
    and s + $CT_{smae}$ = t     // when released in s
If $I_{s,c,a}$ = 0
    then // perhaps component c was built early due to a yield decrease
        call the recursive check_component(c, s, a, (qty /
        $YIELD_{s,m,a,e}$) * $QTYPER_{smaec}$)    // adjustments for Yield and
                                              Bills of Material Qty Per
}

---

The embodiments of the invention described above can take the form of an entirely hardware embodiment, an entirely software embodiment or an embodiment including both hardware and software elements. For example, an embodiment of the present invention could be implemented on an IBM® P690 server with AFS for data storage and using the AIX operating system. The steps for implementing the present invention are preferably programmed in C/C++. It should be understood by those of ordinary skill in the art, however, that the present invention is not limited to the above implementation and is independent of the computer/system architecture. Accordingly, the present invention may equally be implemented on other computing platforms, programming languages and operating systems, and also may be hardwired into a circuit or other computational component. Thus, embodiments of the invention can be implemented in software, which includes but is not limited to firmware, resident software, microcode, etc.

Additionally, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Therefore, disclosed above are embodiments of an improved production planning method that avoids or limits early builds. The method comprises running a conventional production planning program using standard inputs (e.g., date effective yields). The outputs of the program (e.g., a production plan including planned inventory overstocks at given times) are evaluated to determine if the program plans an early build of a predetermined quantity of a product and, optionally, to determine if the planned early build of that predetermined quantity may have been triggered by a predicted decrease in product yield over time. If an early build of a predetermined quantity of a product is planned and if a correlation exists between the decrease in yield and the early build, then new constraints can be added into the program to avoid or limit the early build of that predetermined quantity of the product. Then, the production planning program is re-run. Thus, the method can be used to reduce early builds due to an incorrect, nominally higher, yield without requiring the user to provide any special additional input data. By reducing early builds, needless build up of inventory is avoided thus resulting in an improved statement of financial conditions and other operating measurements.

Although the embodiments have been described in terms of their application to a production planning environment, the invention may also be embodied in a services industry or another environment involving predicted yields which may decrease over time. For example, in addition to yield referring to the percentage of good products produced, those skilled in the art will recognize that yield may refer to a percentage of service items which receive a discrete attribute of service (e.g. percentage of customers receiving the highest quality rating of service, percentage of rental cars requiring repair, percentage of items requiring expedited service, etc.).

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the disclosed embodiments of the invention can be practiced with modification within the spirit and scope of the appended claims.

What is claimed is:

1. A production planning method comprising:
predicting, by a computer, a first yield for a product during a first time period and a second yield for said product during a second time period, wherein said first time period is earlier than said second time period;
running, by said computer, a production planning program to develop a first plan for producing said product;
evaluating, by said computer, said first plan to determine if said first plan comprises producing a predetermined quantity of said product in said first time period, when said predetermined quantity is to be consumed during said second time period;
if said first plan comprises producing said predetermined quantity in said first time period, adding, by said computer, a constraint and an additional decision variable into said production planning program; and
re-running, by said computer, said production planning program with said constraint and said additional decision variable to develop a second plan for producing said product, said constraint and said additional decision variable ensuring that, in said second plan, said predetermined quantity of said product is allowed to be produced earlier than said second time period, but only with said second yield.

2. The method of claim 1, further comprising, before said adding, determining if said plan to produce said predetermined quantity of said product in said first time period may have been triggered by a decrease between said first yield predicted for said first time period and said second yield predicted for said second time period.

3. The method of claim 1, wherein said running of said production planning program comprises running a production planning program comprising a linear program.

4. The method of claim 2, wherein if inventory costs for said product at subsequent stocking points during production are non-decreasing, then said determining comprises identifying when a planned overstock of inventory at a single stocking point immediately precedes said second time period.

5. The method of claim 2, wherein if inventory costs for said product at subsequent stocking points during production decrease, then said determining comprises identifying a planned overstock of inventory at a single stocking point and searching backwards through the bills of material supply chain recursively to identify said decrease between said first yield and said second yield that caused said production planning program to plan to produce said predetermined quantity of said product prior to said second time period.

6. The method of claim 1, further comprising, before said adding, calculating a maximum production level permissible which would prevent said production planning program from planning to produce said predetermined quantity with said first yield prior to said second time period, and wherein said adding further comprises adding said constraint based on said maximum production level.

7. The method of claim 1, wherein said adding is automatically initiated subject to user established rules.

8. A program storage device readable by computer and tangibly embodying a program of instructions executable by said computer to perform a production planning method, said method comprising:
   predicting a first yield for a product during a first time period and a second yield for said product during a second time period, wherein said first time period is earlier than said second time period;
   running a production planning program to develop a first plan for producing said product;
   evaluating said first plan to determine if said first plan comprises producing a predetermined quantity of said product in said first time period, when said predetermined quantity is to be consumed during said second time period;
   if said first plan comprises producing said predetermined quantity in said first time period, adding at least a constraint into said production planning program; and
   re-running said production planning program with said constraint to develop a second plan for producing said product, said constraint ensuring one of the following:
      that, in said second plan, said predetermined quantity of said product is not to be produced earlier than said second time period; and
      that, in said second plan, said predetermined quantity of said product is allowed to be produced earlier than said second time period, but only with said second yield.

9. The program storage device of claim 8, wherein said method further comprises, before said adding, determining if said plan to produce said predetermined quantity of said product in said first time period may have been triggered by a decrease between said first yield predicted for said first time period and said second yield predicted for said second time period.

10. The program storage device of claim 8, wherein said running of said production planning program comprises running a production planning program comprising a linear program.

11. The program storage device of claim 9, wherein if inventory costs for said product at subsequent stocking points during production are non-decreasing, then said determining comprises identifying when a planned overstock of inventory at a single stocking point immediately precedes said second time period.

12. The program storage device of claim 9, wherein if inventory costs for said product at subsequent stocking points during production decrease, then said determining comprises identifying a planned overstock of inventory at a single stocking point and searching backwards through the bills of material supply chain recursively to identify said decrease between said first yield and said second yield that caused said production planning program to plan to produce said predetermined quantity of said product prior to said second time period.

13. The program storage device of claim 8, wherein said adding is automatically initiated subject to user established rules.

* * * * *